United States Patent
Hu et al.

(10) Patent No.: US 10,625,910 B2
(45) Date of Patent: Apr. 21, 2020

(54) CASE AND SNAP-FITTING ASSEMBLY THEREOF

(71) Applicant: SZ DJI TECHNOLOGY CO., LTD., Shenzhen (CN)

(72) Inventors: Dengfeng Hu, Shenzhen (CN); Aiqing Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 202 days.

(21) Appl. No.: 15/468,461

(22) Filed: Mar. 24, 2017

(65) Prior Publication Data

US 2017/0197765 A1   Jul. 13, 2017

Related U.S. Application Data

(63) Continuation of application No. PCT/CN2014/087777, filed on Sep. 29, 2014.

(51) Int. Cl.
*B65D 45/18* (2006.01)
*B65D 45/20* (2006.01)
(Continued)

(52) U.S. Cl.
CPC .............. *B65D 45/18* (2013.01); *B25H 3/02* (2013.01); *B64C 39/024* (2013.01);
(Continued)

(58) Field of Classification Search
CPC .... B65D 45/18; B65D 25/2852; B65D 85/68; B65D 43/163; B65D 2585/687;
(Continued)

(56) References Cited

U.S. PATENT DOCUMENTS

| 6,217,835 | B1 * | 4/2001 | Riley ..................... A61L 2/26 206/1.5 |
| 2003/0010783 | A1 * | 1/2003 | Prezelin ................. B65D 45/20 220/324 |

(Continued)

FOREIGN PATENT DOCUMENTS

| CN | 1833213 A | 9/2006 |
| CN | 2921223 Y | 7/2007 |

(Continued)

OTHER PUBLICATIONS

The World Intellectual Property Organization (WIPO) International Search Report for PCT/CN2014/087777 dated Jun. 26, 2015 6 Pages.

*Primary Examiner* — James N Smalley
(74) *Attorney, Agent, or Firm* — Anova Law Group, PLLC

(57) ABSTRACT

A case comprises a case body, a case cover, and a snap-fitting assembly comprising a snap-fitting member and a connecting member for fastening the case cover and the case body. The connecting member comprises a first end and a second end opposite to each other. The first end of the connecting member is rotatably connected to one of the case body and the case cover. The other one of the case body and the case cover is provided with a snapping block. The second end of the connecting member is rotatably connected to the snap-fitting member. The snap-fitting member comprises a snapping part configured to be snapped with the snapping block.

18 Claims, 8 Drawing Sheets

(51) Int. Cl.
  *B25H 3/02* (2006.01)
  *H02J 7/00* (2006.01)
  *B64C 39/02* (2006.01)
  *B65D 25/28* (2006.01)
  *B65D 43/16* (2006.01)
  *B65D 85/68* (2006.01)

(52) U.S. Cl.
  CPC ....... *B65D 25/2852* (2013.01); *B65D 43/163* (2013.01); *B65D 45/20* (2013.01); *B65D 85/68* (2013.01); *H02J 7/0044* (2013.01); *H02J 7/0045* (2013.01); *H02J 7/0068* (2013.01); *B64C 2201/042* (2013.01); *B64C 2201/066* (2013.01); *B64C 2201/201* (2013.01); *B65D 2255/00* (2013.01); *B65D 2585/687* (2013.01)

(58) Field of Classification Search
  CPC ... B65D 2255/00; B65D 45/20; H02J 7/0068; H02J 7/0045; H02J 7/0044; B64C 39/024; B64C 2201/042; B64C 2201/066; B64C 2201/201; B25H 3/02
  USPC .......................................... 220/324, 833–835
  See application file for complete search history.

(56) References Cited

U.S. PATENT DOCUMENTS

| | | | |
|---|---|---|---|
| 2006/0017293 A1* | 1/2006 | Tonelli | E05B 65/5276 292/202 |
| 2006/0042897 A1* | 3/2006 | Sanderson | A45C 13/1084 190/120 |
| 2009/0200300 A1* | 8/2009 | Parker | A45C 13/008 220/4.23 |
| 2015/0115894 A1* | 4/2015 | Grepper | F25D 23/00 320/135 |

FOREIGN PATENT DOCUMENTS

| | | |
|---|---|---|
| CN | 200991890 Y | 12/2007 |
| CN | 101115899 A | 1/2008 |
| CN | 201181857 Y | 1/2009 |
| CN | 201410661 Y | 2/2010 |
| CN | 102145781 A | 8/2011 |
| CN | 102599709 A | 7/2012 |
| CN | 202295683 U | 7/2012 |
| CN | 202295726 U | 7/2012 |
| DE | 20303264 U1 | 4/2003 |
| JP | 5430254 Y2 | 9/1979 |

* cited by examiner

CASE AND SNAP-FITTING ASSEMBLY THEREOF

CROSS-REFERENCE TO RELATED APPLICATION

This is a continuation application of international Application No. PCT/CN2014/087777, filed on Sep. 29, 2014, the entire contents of which are incorporated herein by reference.

TECHNICAL FIELD

The present disclosure relates to a case and a snap-fitting assembly thereof, and especially relates to a case for carrying an unmanned aerial vehicle and a snap-fitting assembly thereof.

BACKGROUND

At present, an unmanned aerial vehicle is usually accommodated in a tool case when not in use, and the tool case is embedded with a shock-absorbing and cushioning material such as a foam. The tool case usually uses snap fitting to lock the unmanned aerial vehicle inside; however, existing snap-fitting parts are either fastened too tightly, making it difficult to open the tool case, or too loosely, such that the tool case is easily opened by mistake, which in turn causes the unmanned aerial vehicle to fall out of the tool case.

SUMMARY

In consideration of the above-mentioned contents, it is necessary to provide a case and a snap-fitting assembly thereof, such that the case can be fastened tightly and opened conveniently.

A case, comprising a case body, a case cover, at least one snap-fitting member and at least one connecting member for fastening the case cover and the case body; the connecting member comprises a first end and a second end which are opposite to each other, the first end of the connecting piece is rotatably connected to one of the case body and the case cover, the other one of the case body and the case cover is provided with at least one snapping block, and the amounts of the snap-fitting members, the connecting members and the snapping blocks are identical; and the second end of the connecting member is rotatably connected to the snap-fitting member, and the snap-fitting member comprises a snapping part which can be snapped in the snapping block.

In some embodiments, the snap-fitting member comprises a first plate body and a second plate body extending from one side of the first plate body, the second end of the connecting member is rotatably connected to the first plate body, and the snapping part extends out from the second plate body.

In some embodiments, the side of the snapping part which faces towards the first plate body is bent and extends to form a lock catch, and the snapping block is provided with a slot in which the lock catch can be snapped.

In some embodiments, the cross-sections of the lock catch and the slot are in the shape of an arch.

In some embodiments, the snapping part is perpendicular to the second plate body.

In some embodiments, the snapping block is arranged on the case body and the first end of the connecting member is rotatably connected to the case cover.

In some embodiments, the first plate body is bent.

In some embodiments, the case body comprises a first side wall and a second side wall opposite to the first side wall, the case cover comprises a first installation wall and a second installation wail opposite to the first installation wall, the snapping block is arranged on an outer side surface of the first side wall, the first end of the connecting member is rotatably connected to the first installation wall, and the second installation wall is rotatably connected to the second side wall.

In some embodiments, two first stopping sheets are arranged on the first side wall at the two, sides of each snapping block.

In some embodiments, at least one pair of pivoting blocks is arranged on an outer side surface of the first installation wall, the amount of the pivoting block pairs is identical to that of the connecting members, the first end of the connecting member is located between the pivoting blocks, the first end of the connecting member is provided with a first perforated hole, a rotating shaft extends from the side of one pivoting block which fixes towards the other pivoting block in each pivoting block pair, and the two rotating shafts are respectively snapped in two ends of the first perforated hole.

In some embodiments, two second stopping sheets are arranged on the outer side surface of the first installation wall at the two sides of each pivoting block pair.

In some embodiments, an extension part, extends from each end of the first plate body, each extension part is provided with a through hole, the second end of the connecting member is located between the two extension parts of the snap-fitting member, the second end of the connecting member is provided with a second perforated hole, the snap-fitting member and the connecting member are rotatably connected via a pin, and the pin passes through the through holes of the two extension parts of the snap-fitting member and the second perforated hole of the second end of the connecting member.

In some embodiments, the second installation wall is rotatably connected to the second side will via two hinges.

In some embodiments, the snapping block is arranged on the case cover and the first end of the connecting member is rotatably connected to the case body.

In some embodiments, the thickness of the first plate body is smaller than that of the second plate body.

In some embodiments, each connecting member is two parallel connecting rods separated from each other.

In some embodiments, the snap-fating member comprises a first plate body, a second plate body extending from one side of the first plate body and a protrusion, the protrusion is connected to the second plate body and extends to the first plate body, the second end of the connecting member is rotatably connected to the first plate body, and the snapping part extends perpendicularly from the protrusion.

In some embodiments, the width of the protrusion is smaller than that of the second plate body.

In some embodiments, the case also comprises a power source installed on the case cover or the case body.

In some embodiments, the power source comprises a rechargeable bane a power source port and a cable electrically connected to the power source port and the rechargeable battery.

In some embodiments, the rechargeable battery and the cable are embedded in the case cover and the power source port is fixed on the case cover and is exposed.

In some embodiments, the case cover comprises a rectangular top wall and a first installation wall, a second installation wall and two connecting walls extending from the edges of the top wall, the first installation wall and the second installation wall are provided opposite to each other, the two connecting walls are provided opposite to each other, and the second installation wall is rotatably connected to the case body.

In some embodiments, the rechargeable battery is embedded in the top wall of the case cover.

In some embodiments, the power source port is fixed on the first installation wall of the case cover.

In some embodiments, the cable is embedded in the top wall and the installation wall.

A snap-fitting assembly, comprising a snap-fitting member and a connecting member, wherein the snap-fitting member comprises a first plate body and a second plate body extending from one side of the first plate body, one end of the connecting member is rotatably connected to the first plate body, and a snapping part extends from the second plate body.

In some embodiments, the snapping part is perpendicular as to the second plate body.

In some embodiments, the first plate body is bent.

In some embodiments, an extension pan extends perpendicularly from each end of the first plate body and the connecting member is rotatably connected between the two extension parts.

In some embodiments, the thickness of the first plate body is smaller than that of the second plate body.

In some embodiments, the side of the snapping part which faces towards the first plate body is bent and extends to form a lock catch.

In some embodiments, the cross-section of the lock catch is in the shape of an arch.

The snapping pan of the snap-fitting member of the case disclosed in the present disclosure can be snapped with the snapping block so as to tightly fasten the case, and the snap-fitting member is rotatably connected to the movable connecting member, which improves the mobility of the snap-fitting member when being unlocked, thereby facilitating the opening of the case.

DESCRIPTION OF THE EMBODIMENTS

Figure 1:
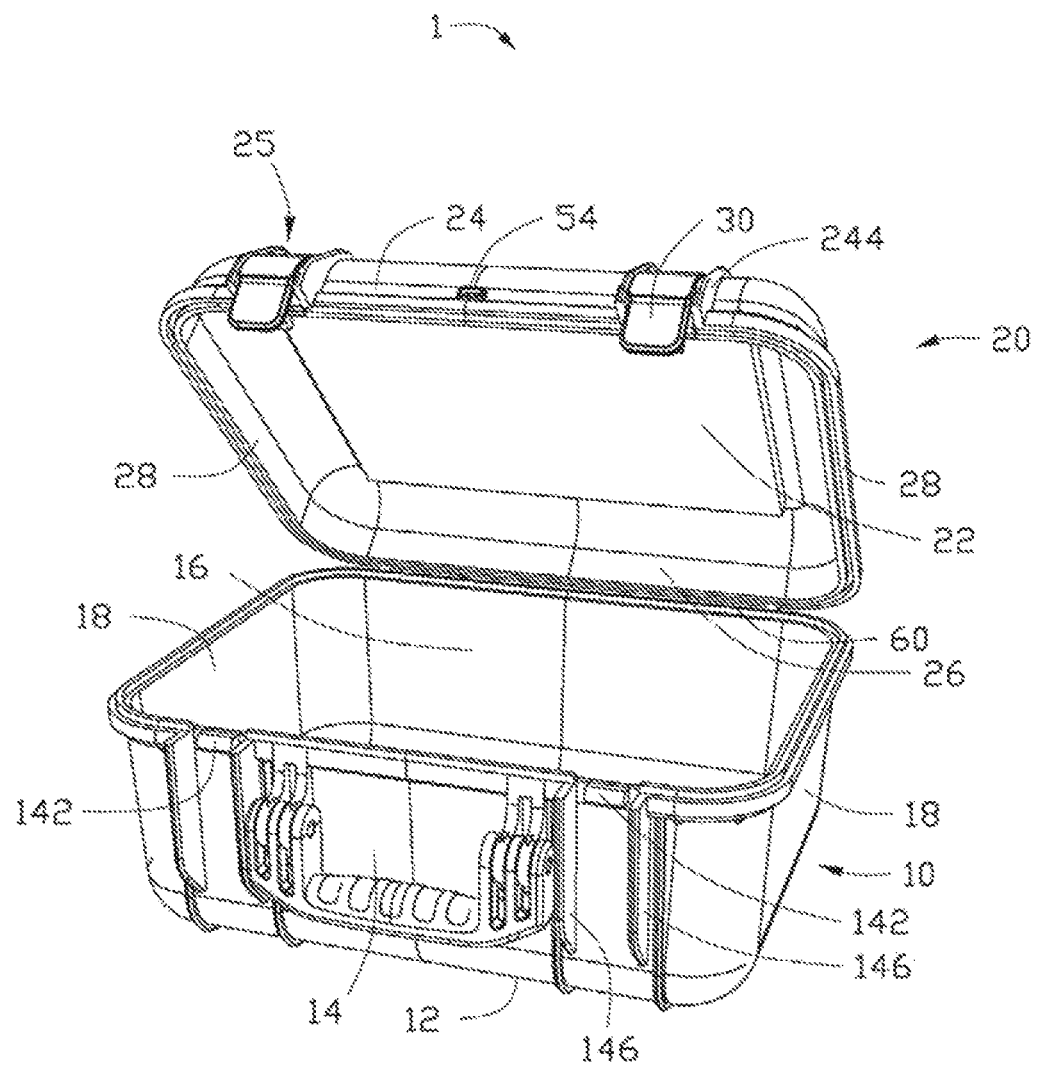
FIG. 1 is a perspective view of the case in the first embodiment of the present disclosure, wherein the case is in an open state.
Figure 2:
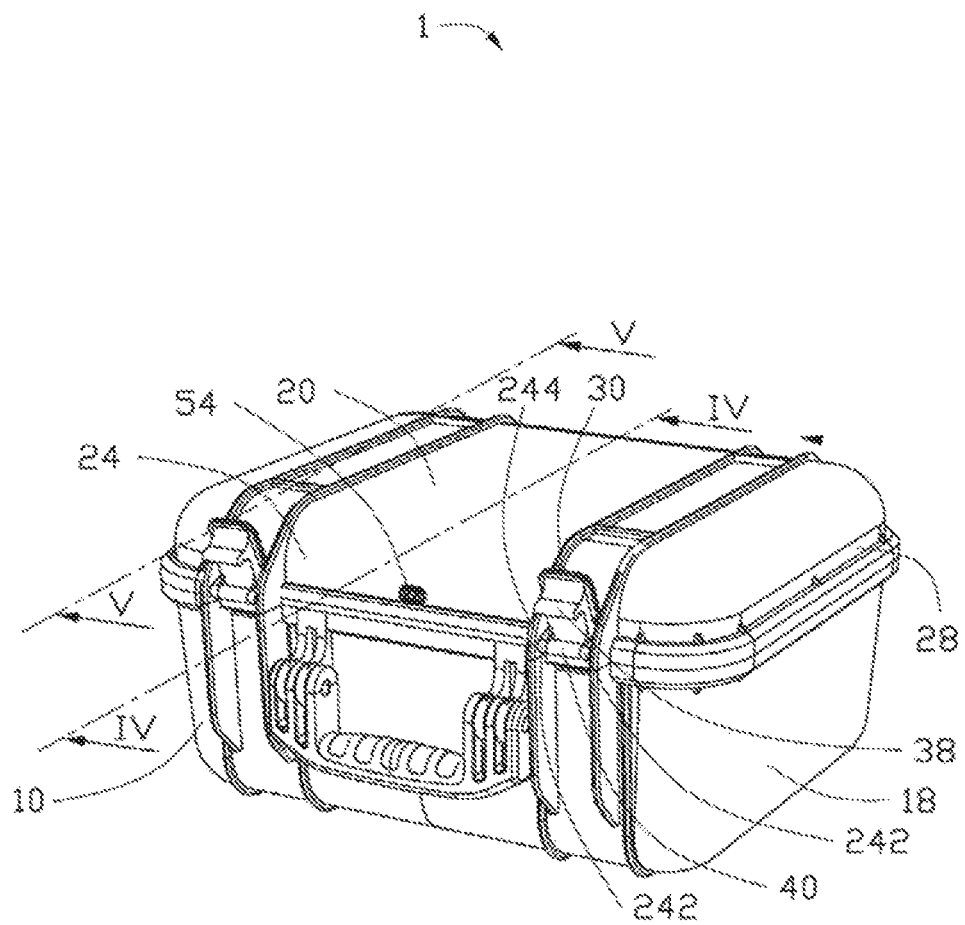
FIG. 2 is a perspective view of the case shown in FIG. 1 in a closed state.
Figure 4:
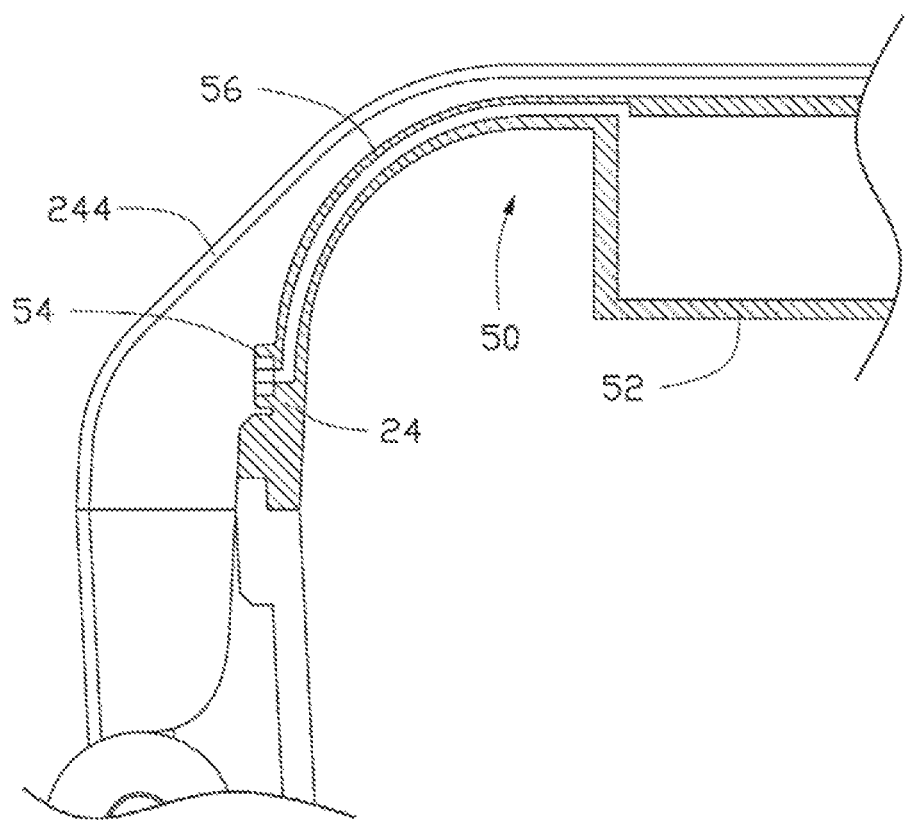
FIG. 4 is a sectional view of the case shown in FIG. 2 along an IV-IV line.

Please refer to FIGS. 1, 2 and 4, wherein a case 1 in an embodiment of the present disclosure comprises a case body 10, a case cover 20, two snap-fitting assemblies 25 for snapping the case cover 20 with the case body 10, and a power source 50. An unmanned aerial vehicle or other devices can be placed in the case body 10. Each snap-fitting assembly 25 comprises a snap-fitting assembly 30 and a connecting member 40.

Figure 6:
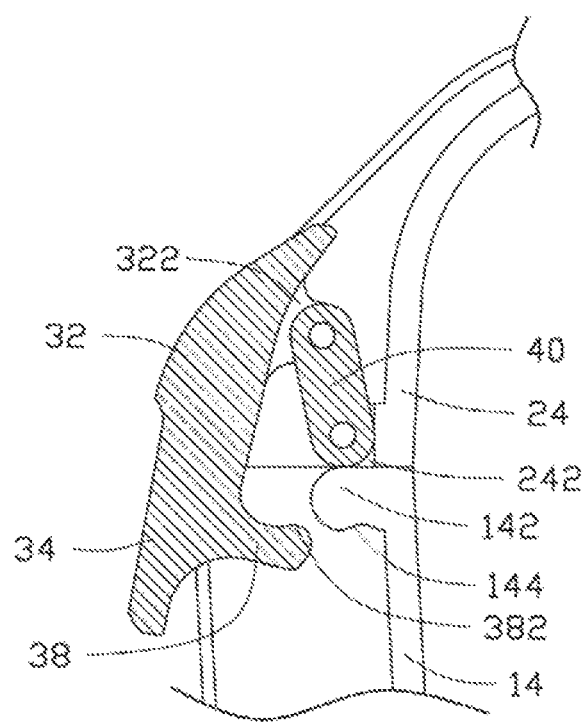

The case body 10 comprises a bottom wall 12 in a substantially rectangular shape, and a first side wall 14, a second side wall 16 and two third side walls 18 extending upwards from the edges of the bottom wall 12. The first side wall 14 and the second side wall 16 are provided opposite to each other and the two third side walls 18 are provided opposite to each other. One of the third side walls 18 is connected between one end of the first side wall 14 and one end of the second side wall 16 and the other one of the third side walls 18 is connected between the other end of the first side wall 14 and the other end of the second side wall 16. Two snapping blocks 142 are arranged on a top pan of an outer, side surface of the first side wall 14. A slot 144 is arranged on a bottom surface of each snapping block 142 (see FIG. 6). Two first stopping sheets 146 are arranged on the outer side surface of the first side wall 14 at the two sides of each snapping block 142.

The case body 20 comprises a top wall 22 in a substantially rectangular shape and a first installation wall 24, a second installation wall 26 and two connecting walls 28 extending upwards from the edges of the top wall 22. The first installation wall 24 and the second installation wail 26 are provided opposite to each other, and the two connecting walls 28 are provided opposite to each other. One of the connecting walls 28 is connected between one end of the first installation wall 24 and one end of the second installation wall 26; and the other one of the connecting walls 28 is connected between the other end of the first installation wall 24 and the other end of the second installation wall 26.

Two pairs of pivoting blocks 242 are arranged on the outer side surface of the first installation wall 24 which is far away from the top wall 22. Two second stopping sheets 244 are arranged on the outer side surface of the first installation wall 24 at the two sides of each pair of pivoting blocks 242.

The second installation wall 26 is numbly connected to the second side wall 16. In this embodiment, the side of the second installation wall 26 which is far away from the top wall 22 and the top part of the second side wall 16 are rotatably connected via two hinges 60. In another embodiment, the second installation wall 26 and the second side wall 16 can be connected via an elastic material, such as rubber, such that the second installation wall 26 is mutably connected to the second side wall 16.

Figure 3:
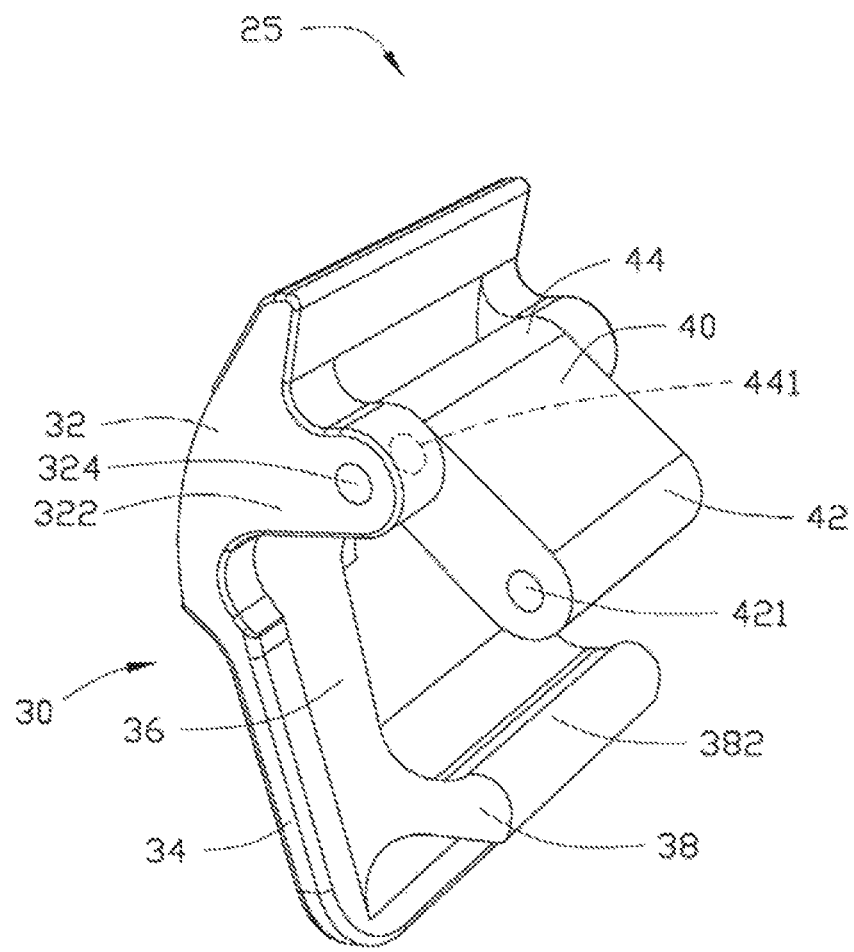
FIG. 3 is a perspective view of the snap-fitting assembly of the case shown in FIG. 1.

Please refer to FIGS. 2 and 3, wherein each snap-fitting member 30 comprises a bent first plate body 32, a second plate body 34 extending from one side of the first plate body 32 and a protrusion 36. An extension part 322 extends from each end of the first plate body 32. Each extension part 322 is provided with a through hole 324. The two through holes 324 are aligned with each other. The protrusion 36 is connected to the second plate body 34 and extends to the first plate body 32. The width of the protrusion 36 is smaller than that of the second plate body 34. A snapping part 38 which is substantially perpendicular to the second plate body 34 extends from the end of the protrusion 36 which is far away from the first plate body 32. The side of the snapping part 38 which faces towards the first plate body 32 is bent and extends to form a lock catch 382.

The shape and site of the lock catch 382 of the snap-fitting member 30 match the shape and size of the slot 144. In this embodiment, the cross-sections of the lock catch 382 and the slot 144 are in the shape of an arch. In other embodiments, the cross-sections of the lock catch 382 and the slot 144 can also be in another shape, such as a rectangle or a triangle.

In another embodiment, the first plate body 32 does not have to be in a bent state and is arranged to be parallel with the second plate body 34.

In another embodiment, the protrusion 36 can be omitted and the snapping part 38 can directly extend from the second plate body 34.

Each connecting member 40 comprises a first end 42 and a second end 44 which are opposite to each other. The first end 42 is provided with a first perforated hole 421 passing through two sides of the connecting member 40. The second end 44 is provided with a second perforated hole 441 passing through two sides of the connecting member 40.

Figure 5:
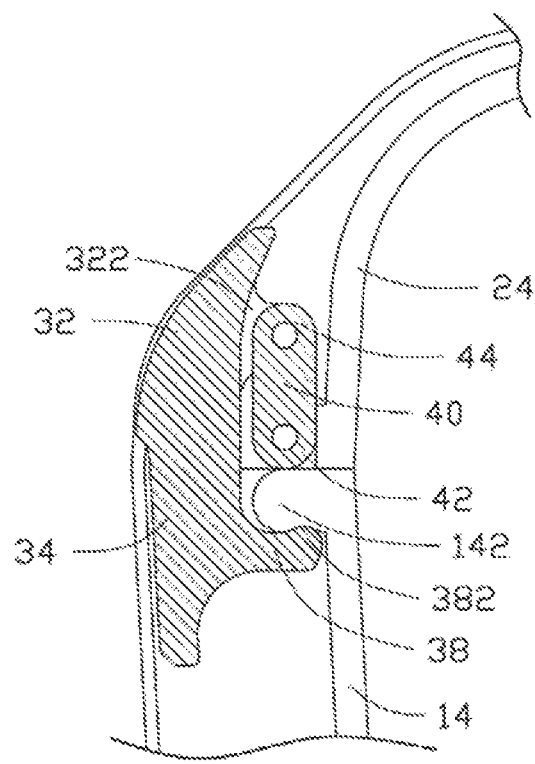
FIGS. 5 and 6 are sectional views of the case shown in FIG. 2 in different states along a V-V line.

Please refer to FIGS. 2, 3 and 5, the first end 42 of the connecting member 40 is rotatably connected to a pair of pivoting blocks 242 on the case cover 20 respectively; and the second end 44 of the connecting member 40 is rotatably connected to the first plate body 32 of the snap-fitting member 30.

In this embodiment, the first end 42 of each connecting member 40 is located between the corresponding pair of pivoting blocks 242. A rotating shaft extends from the side, which faces towards the other pivoting block 242, of each pivoting block 242 in the pair of pivoting blocks 242. Both of the two rotating shafts are respectively snapped in two ends of the first perforated hole 421 on the first end 42 of the connecting member 40, such that the first end 42 of the connecting member 40 is rotatably connected to the corresponding pairs of pivoting blocks 242.

In this embodiment, the first perforated bole 421 on the first end 42 of each connecting member 40 can be omitted. Each rotating shaft extends from the first end 42 of the connecting member 40 which faces towards the corresponding pair of pivoting blocks 242. Each pivoting block 242 is provided with a snapping hole. The two rotating shafts of the first end 42 of the connecting member 40 are respectively snapped in the snapping holes of the corresponding pair of pivoting blocks 242, such that the first end 42 of the connecting ember 40 is rotatably connected to the corresponding pairs of pivoting blocks 242.

In this embodiment, the second end 44 of each connecting member 40 is located between two corresponding extension parts 322 of the snap-fitting member 30. A pin is passed through the through holes 324 on two extension parts 322 of the snap-fitting member 30 and a second perforated hole 441 of the second end 44 of the connecting member 40, such that the second end 44 of the connecting member 40 is rotatably connected to the first plate body 32 of the snap-fitting member 30.

In another embodiment, the second perforated hole 441 on the second end 44 of each connecting member 40 can be omitted. Two snapping posts facing towards the two extension parts 322 of the corresponding snap-fitting member 30 respectively extend from the second end 44 of the connecting member 40. The two snapping posts of the connecting member 40 are respectively snapped in the through holes 324 on the two extension parts 322 of the corresponding snap-fitting member 30, such that the second end 41 of the connecting member 40 is rotatably connected to the first plate body 32 of the snap-fitting member 30.

Please refer to FIGS. 2 and 4, wherein the power source 50 comprises a rechargeable battery 52, a power source port 54, and a cable 56 electrically connected to the power source port 54 and the rechargeable battery 52. The rechargeable battery 52 is embedded in the top will of the case cover 20, therefore avoiding the exposure of the rechargeable battery 52. The power source port 54 is fixed on the middle part of the first installation wall 24 of the case cover 20 and is exposed. The power source port 54 can be connected to an external power source to recharge the rechargeable battery 52 and the power source port 54 can also be connected to an unmanned aerial vehicle, such that the rechargeable battery 52 supplies power to the unmanned aerial vehicle. The cable 56 is embedded on the top wall 22 of the case cover 20 and in the first installation wall 24.

In other embodiments, the rechargeable battery 52 can be embedded in any connecting wall 28 of the case cover 20; alternatively, the rechargeable battery 52 does not have to be embedded in the case cover 20, and the rechargeable battery 52 can be fixed on the inner side surface of the top wall 22 or the inner side surface of any connecting wall 28; or a protecting cover can be fixed on the inner side surface of the top wall 22 or the inner side surface of any connecting wall 28; and the rechargeable battery 52 is accommodated in the protecting cover, and the protecting cover is provided with a through hole for the cable 56 to pass through.

In other embodiments, the power source port 54 can be fixed in another position, for example, the power source port 54 can be fixed on the inner side surface of the top wall 22 of the case cover 20 via a hook-and-loop fastener and the hook-and-loop fastener can be torn off when needing to use the power source port 54.

In other embodiments, different parts of the cable 56 in the length direction thereof can be fixed on the case cover 20 by means of a plurality of cable ties so as to make the cable 56 be routed in order.

In other embodiments, the power source 50 can be installed in the case body 10, for example, the rechargeable battery 52 can be embedded in the second side wall 16 and the power source port 54 can be fixed to any one of the third side walls 18.

In other embodiments, the power source 50 also comprises a control chip electrically connected to the rechargeable battery 52, and can communicate with the rechargeable battery 52. The communication contents of the control chip with the rechargeable battery 52 comprise at least one of the following: a battery voltage, a residual battery capacity and a battery temperature. The control chip controls the recharging and discharging of the rechargeable battery 52 according to the communication contents.

Please refer to FIGS. 1, 2, 5 and 6, wherein, when the case cover 20 of the case 1 needs to be closed and tightly snapped with the case body 10, the case cover 20 is rotated downwards so that the first installation wall 24 of the case cover 20 abuts against the first side wall 14 of the case body 10, the second installation wall 26 of the case cover 20 abuts against the second side wall 16 of the case body 10, and the two connecting walls 28 of the case cover 20 respectively abut against the two third side walls 18 of the case body 10, therefore closing the case body 10. Rotating the two snap-fitting members 30 enables the snapping parts 38 of the snap-fitting members 30 to respectively snap with and abut against the bottom surfaces of the snapping blocks 142. The lock catches 382 of the snapping parts 38 are respectively snapped in the slots 144 of the snapping blocks 142. The snapping block 142 per se is elastic so as to aid the snapping part 38 in snapping with the snapping block 142. During the rotation of the snap-fitting member 30, the connecting member 40 is driven by the snap-fitting 30 to rotate until it is substantially perpendicular to the snapping block 142. The connecting member 40 abuts against the top surface of the snapping block 142. At this time, the case cover 20 is tightly snapped with the case body 10.

When the case cover 20 needs to be unlocked, the snap-fitting member 30 is rotated to cause the lock catch 382 of the snapping part 38 to exit the slot 144 of the snapping block 142. The connecting member 40 rotates along with the snap-fitting member 30. When the snapping part 38 of the snap-fitting member 30 is completely released from the snapping block 142, the case cover 20 can be opened.

In other embodiments, the positions of the lock catch 382 and the slot 144 can be exchanged, i.e. the lock catches 382 are respectively arranged on the bottom surfaces of the snapping blocks 142, and the slots 144 are respectively arranged on the snapping parts 38.

In other embodiments, the amounts of the snap-fitting members 30, the connecting members 40, the snapping blocks 142 and the pivoting blocks 242 can be changed according to requirements. The amounts of the snap-fitting members 30, the connecting members 40 and the snapping blocks 142 can also be one, three, four or more, and correspondingly, the amount of the pivoting blocks 242 can also be one pair, three pairs, four pairs or more.

In other embodiments, each connecting member 40 can be two parallel connecting rods separated from each other, the first end of each connecting rod is rotatably connected with one corresponding pivoting block 242, and the two extension parts 322 of each snap-fitting member 30 are respectively connected to the second ends of the two corresponding connecting rods.

Figure 7:
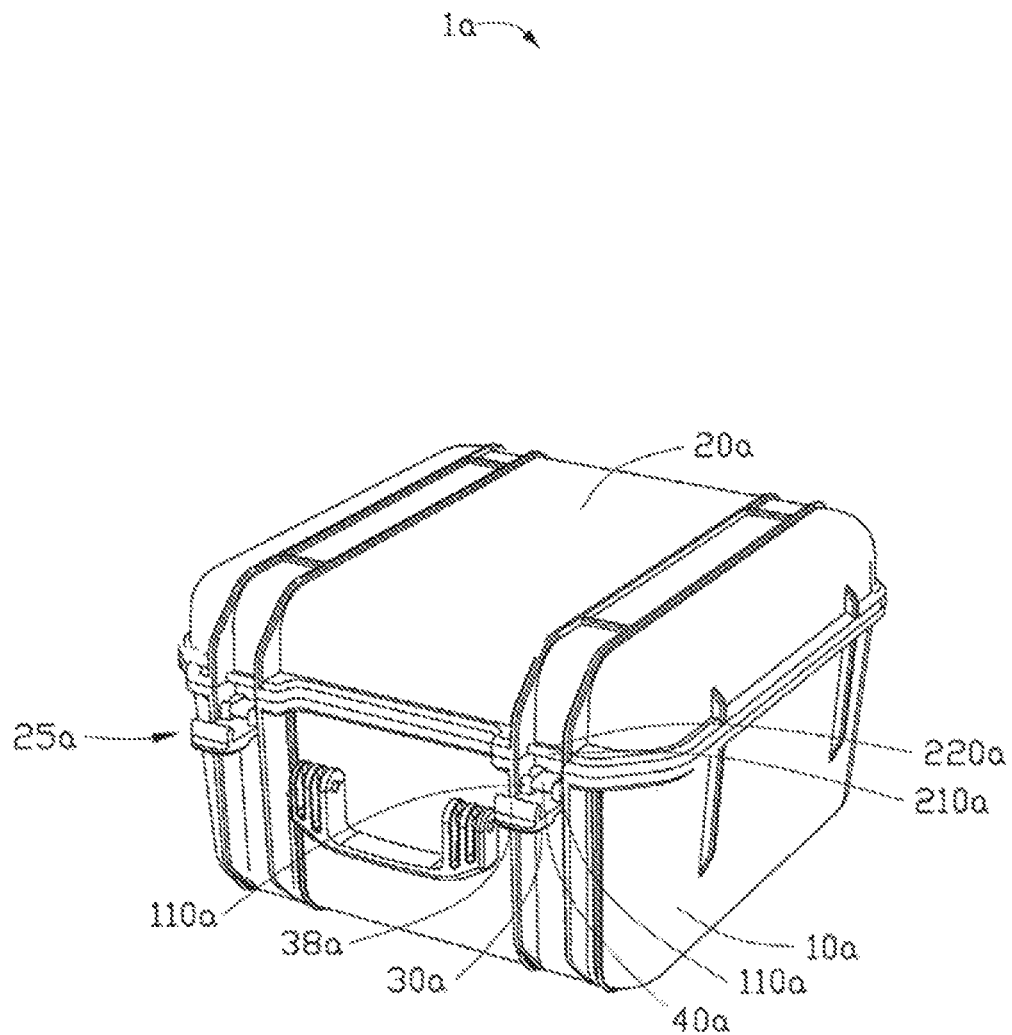
FIG. 7 is a perspective view of the case in another embodiment of the present disclosure.
Figure 8:
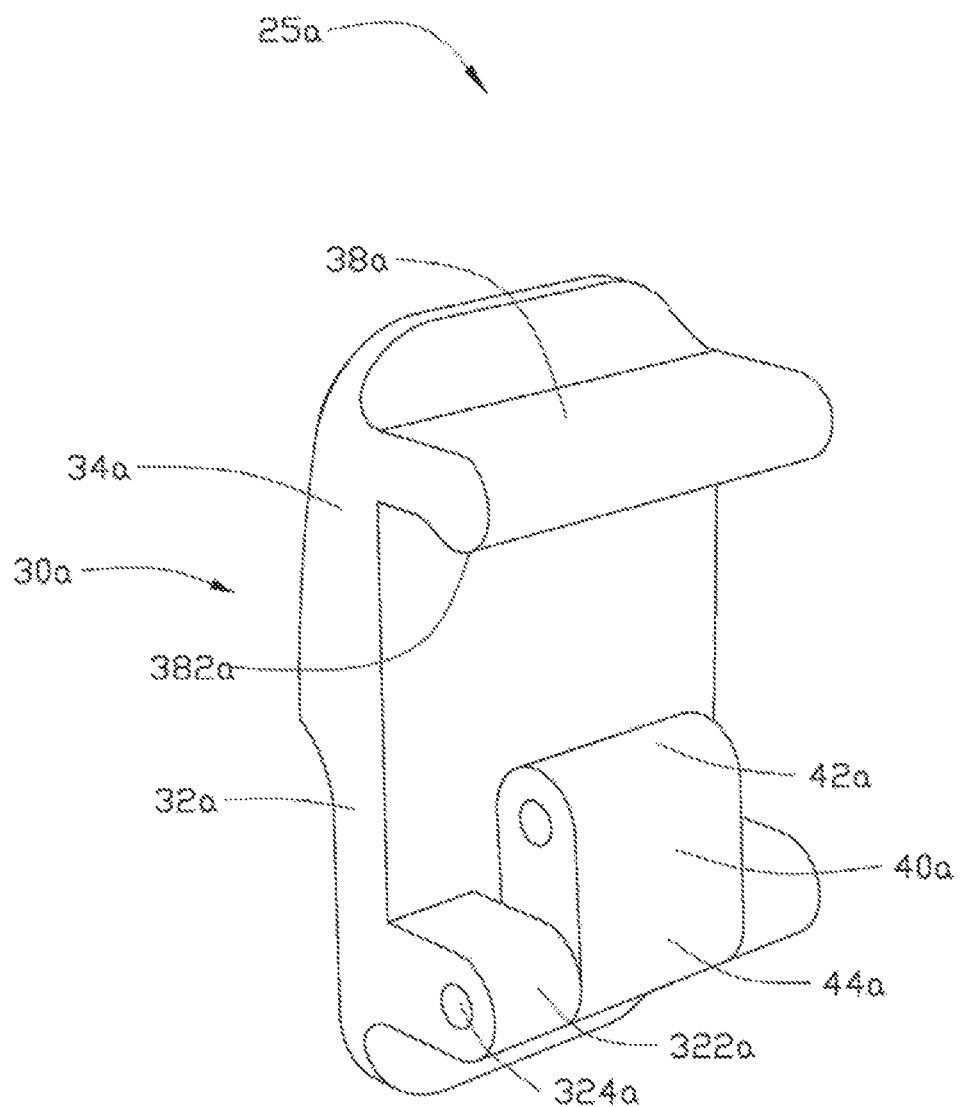
FIG. 8 is a perspective view of the snap-fitting assembly of the case shown in FIG. 7.

Please refer FIGS. 7 and 8, wherein the case 1a in another embodiment of the present disclosure comprises a case body 10a, a case cover 20a and two snap-fitting assemblies 25a. Each snap-fitting assembly 25a comprises a snap-fitting member 30a and a connecting member 40a.

The structures of the case body 10a and the case body 10 are basically identical, while the difference only lies in that the case body 10a is provided with two pairs of pivoting blocks 110a at corresponding positions, instead of providing same with the snapping block 142 of the case body 10.

The structures of the case cover 20a and the case cover 20 are basically identical, while the difference only lies in that the case body 20a is provided with two snapping blocks 210a at corresponding positions, instead of providing same with the pivoting block 242 of the case cover 20. Each snapping block 210a is provided with a slot 220a on the top surface thereof.

Each snap-fitting member 30a comprises a first plate body 32a and a second plate body 34a extending from one side of the first plate body 32a. An extension part 322a extends perpendicularly from each end of the first plate body 32a. Each extension part 322a is provided with a through hole 124a. A snapping part 38a which is substantially perpendicular to the second plate body 34a extends from the end of the second plate body 34a which is far away from the first plate body 32a, The side of the snapping part 38a which faces towards the first plate body 32a is bent and extends to form a lock catch 82a. The thickness of the first plate body 32a is smaller than that of the second plate body 34a, and of course, the thickness of the first plate body 32a can also be equal to or greater than that of the second plate body 34a according to actual requirements.

The shape and size of the lock catch 382a of the snap-fitting member 30a match the shape and size of the slot 220a.

The structure of each connecting member 40a is identical to that of the connecting member 40. Each connecting member 40a comprises a first end 42a and a second end 44a which are opposite to each other.

The first end 42a of the connecting member 40a is rotatably connected to the two pairs of pivoting blocks 110a of the case body 10a respectively; and the specific connection thereof is identical to the rotatable connection of the first end 42 of the connecting member 40 with the two pairs of pivoting blocks 242 on the case cover 20, and will not be described here redundantly. The second end 44a of the connecting member 40a is rotatably connected to the first plate body 32a of the snap-fitting member 30a respectively; the specific connection thereof is identical to the rotatable connection of the second end 44 of the connecting member 40 with the first plate body 32 of the snap-fitting member 30, and will not be described here redundantly.

The snapping and unlocking of the case cover 20a and the case body 10a via the snap-fitting member 30a and the connecting member 40a are identical to the snapping and unlocking of the case cover 20 and the case body 10 via the snap-fitting member 30 and the connecting member 40, and will not be described here redundantly.

Of course, the power source 50 can also be installed in the case 1a, and the installation and position thereof can be identical to the installation and position of the power source 50 in the case 1, and will not be described here redundantly.

It can be understood that a person skilled in the art could make other corresponding changes and transformations according to the technical concept of the present disclosure, and these changes and transformations should all fall with the scope of protection of the claims in the present disclosure.

What is claimed is:

1. A case, comprising:
   a case body;
   a case cover; and
   a snap-fitting member and a connecting member for fastening the case cover and the case body, wherein:
      the connecting member comprises a first end and a second end, the first end of the connecting member being rotatably connected to one of the case body and the case cover, and the second end of the connecting member being rotatably connected to the snap-fitting member,
      the other one of the case body and the case cover comprises a snapping block,
      the snap-fitting member comprises:
         a snapping part configured to be snapped with the snapping block,
         a first plate body rotatably connected to the second end of the connecting member and a second plate body extending from one side of the first plate body,
         a protrusion connected to the second plate body and extending to the first plate body, the snapping part extending perpendicularly from the protrusion, and
      the snap-fitting member covers the connecting member on an outer surface of the case when the case cover and the case body are fastened.

2. The case of claim 1, wherein:
   the snapping part is formed on and extends from one side of the second plate body away from the first plate body.

3. The case of claim 2, wherein:
   the snapping block comprises a slot, and
   the snapping part comprises a lock catch formed on and protruding from a side of the snapping part facing the first plate body, the lock catch being configured to snap in the slot of the snapping block.

4. The case of claim 1, wherein the snapping block is arranged on the case body and the first end of the connecting member is rotatably connected to the case cover.

5. The case of claim 4, wherein:
   the case body comprises a first side wall and a second side wall opposite to the first side wall, the case cover comprises a first installation wall and a second installation wall opposite to the first installation wall,
the snapping block is arranged on an outer side surface of the first side wall,
the first end of the connecting member is rotatably connected to the first installation wall, and
the second installation wall is rotatably connected to the second side wall.

6. The case of claim 5, wherein the first side wall comprises two stopping sheets arranged at two sides of the snapping block.

7. The case of claim 5, wherein:
the first installation wall comprises a pair of pivoting blocks arranged on an outer side surface of the first installation wall,
the first end of the connecting member is located between the pivoting blocks and comprises a perforated hole, and
each of the pivoting blocks comprises a rotating shaft extending from a side of the pivoting block facing the other pivoting block, the rotating shaft being snapped in one end of the perforated hole.

8. The case of claim 7, wherein:
the stopping sheets are first stopping sheets, and
the first installation wall further comprises two second stopping sheets arranged on the outer side surface of the first installation wall at two sides of the pair of pivoting blocks.

9. The case of claim 7, wherein:
the perforated hole is a first perforated hole,
the first plate body comprises two extension parts extending from two ends of the first plate body, respectively, each of the extension parts comprising a through hole,
the second end of the connecting member is located between the two extension parts of the snap-fitting member and comprising a second perforated hole, and
the snap-fitting member and the connecting member are rotatably connected via a pin inserted in the through holes of the two extension parts of the snap-fitting member and the second perforated hole on the second end of the connecting member.

10. The case of claim 5, further comprising two hinges rotatably connecting the second installation wall to the second side wall.

11. The case of claim 1, further comprising:
a power source installed on the case cover or the case body, the power source comprising a rechargeable battery, a power source port, and a cable electrically connected to the power source port and the rechargeable battery, the rechargeable battery and the cable being embedded in the case cover, and the power source port being fixed on the case cover and exposed.

12. The case of claim 11, wherein the case cover comprises:
a rectangular top wall, the rechargeable battery being embedded in the top wall;
a first installation wall and a second installation wall opposite to each other, the second installation wall being rotatably connected to the case body; and
two connecting walls extending from two edges of the top wall, respectively, and opposite to each other.

13. The case of claim 12, wherein the power source port is fixed on the first installation wall of the case cover, and the cable is embedded in the top wall and the first installation wall.

14. A snap-fitting assembly, comprising:
a snap-fitting member comprising:
a first plate body;
a second plate body extending from the first plate body; and
a snapping part extending from an end of the second plate body away from the second plate body and bent toward the first plate body;
a protrusion connected to the second plate body and extending to the first plate body, the snapping part extending perpendicularly from the protrusion; and
a connecting member, one end of the connecting member being rotatably connected to an end of the first plate body away from the second plate body.

15. The snap-fitting assembly of claim 14, wherein the snapping part is perpendicular to a top surface of the second plate body, and the first plate body has a curved shape.

16. The snap-fitting assembly of claim 14, wherein:
the snap-fitting member further comprises two extension parts extending perpendicularly from two ends of the first plate body, respectively, and
the connecting member is rotatably connected between the two extension parts.

17. The snap-fitting assembly of claim 14, wherein the snapping part comprises a lock catch formed on and protruding from a side of the snapping part facing the first plate body.

18. The snap-fitting assembly of claim 17, wherein a cross-section of the lock catch has an arch shape.

* * * * *